UNITED STATES PATENT OFFICE.

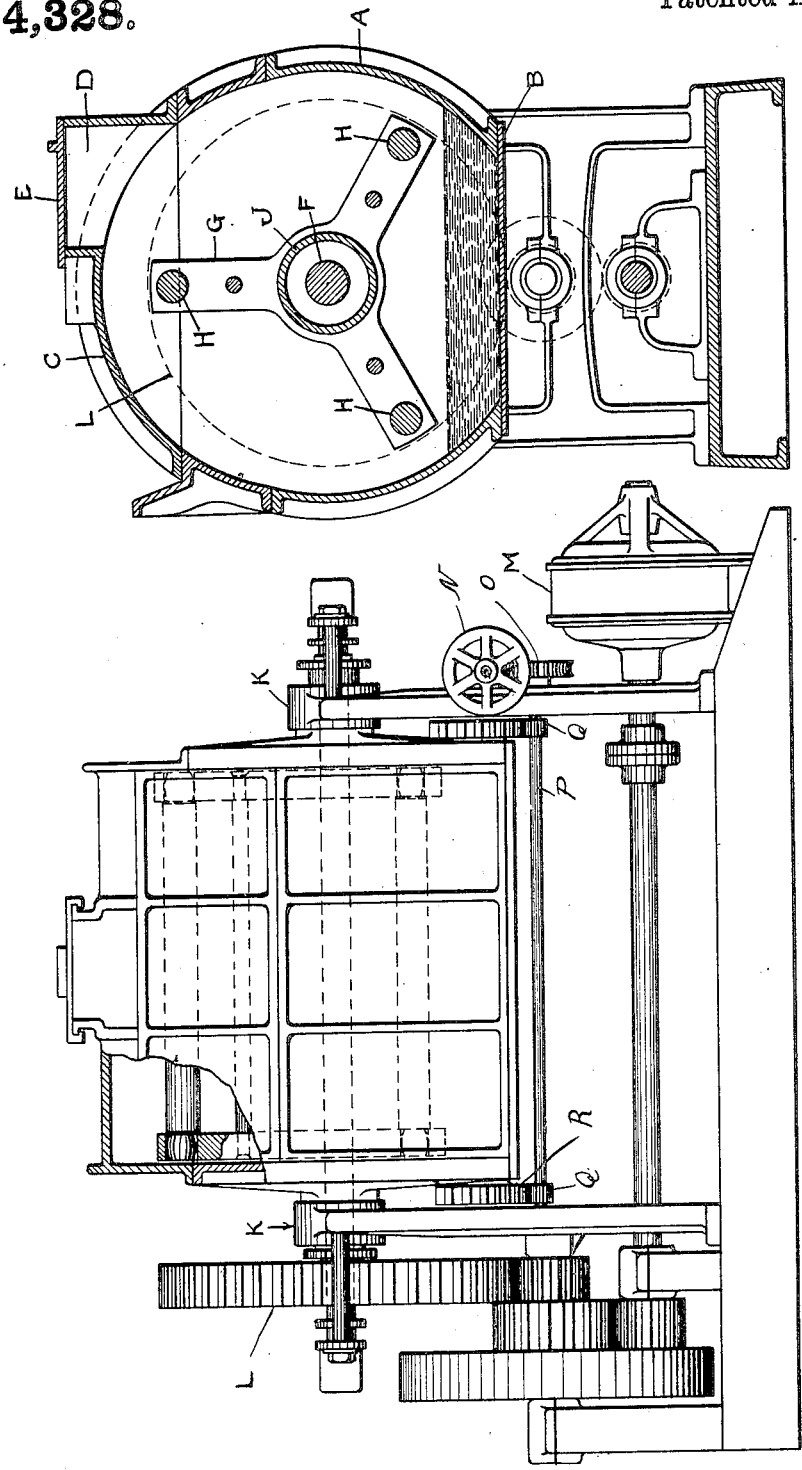
J. C. GORDON.
DOUGH MIXING MACHINE.
APPLICATION FILED JULY 2, 1912.
1,134,328.
Patented Apr. 6, 1915.
WITNESSES:
W. K. Ford
James P. Barry
INVENTOR
James C. Gordon
BY
Whittemore Hulbert & Whittemore
ATTORNEY

JAMES C. GORDON, OF DETROIT, MICHIGAN.

DOUGH-MIXING MACHINE.

1,134,328.  Specification of Letters Patent.  Patented Apr. 6, 1915.

Application filed July 2, 1912. Serial No. 707,227.

*To all whom it may concern:*

Be it known that I, JAMES C. GORDON, a citizen of the United States of America, residing at Detroit, in the county of Wayne and State of Michigan, have invented certain new and useful Improvements in Dough-Mixing Machines, of which the following is a specification, reference being had therein to the accompanying drawings.

The invention relates to dough mixing machines and has for its object the obtaining of a construction in which the dough is manipulated in a novel manner, being subjected to a rolling as distinguished from a tearing or shredding action.

In the drawings: Figure 1 is a side elevation of the machine; and Fig. 2 is a vertical section therethrough.

A is a substantially cylindrical receptacle, forming the mixing chamber, and which at its bottom is provided with a flattened portion B.

C is a hinged section forming a removable cover to the cylinder, but having its inner surface forming a continuation of the inner surface of the body portion of the cylinder. The cover is also provided with an opening D which is closed by a slide E, forming an observation opening and also a means for introducing the ingredients of the dough into the cylinder.

F is a rotatable shaft passing axially through the cylinder, and upon which are mounted radial arms G arranged at opposite ends of the cylinder.

H are rolls journaled at their opposite ends in the radial arms G, so as to independently revolve. These rolls are so positioned that in traveling through their orbit they will pass in proximity to the center of the flattened portion B, but during the remaining portion of their movement will be spaced from the walls of the cylinder A. The inner wall of the cylinder A, instead of being concentric with the axis of the shaft F, is slightly eccentric in the upper portion thereof, constituting the cover C and a part of the body, to provide greater clearance between said surface and the orbit of the rolls.

J is a hollow casing surrounding the shaft F, into which a cooling medium may be introduced to control the temperature of the dough within the cylinder. The rotary shaft and drum are supported upon a suitable frame K.

With the construction as described rotary motion is imparted to the shaft F by a suitable drive mechanism such as the gearing L, driven from the electric motor M. This will cause the shaft and radial arms to revolve, which carry the rolls H through their orbit, just clearing the center of the flat bottom B but spaced from the sides and top of the receptacle. When the ingredients for forming the dough are introduced they will first be stirred by the revolving rolls until a plastic mass is formed, after which the action will be a rolling one. When the dough mass is upon the bottom of the receptacle it will be squeezed by the passing roll which in revolving about its own axis distributes the dough and prevents a shredding or tearing action. The mass however does not remain upon the bottom B but is carried around by the propelling action of the rolls and in so traveling rolls in contact with the surface of the cylinder until it again rests upon the flat bottom B. There is very little interruption in the continuity of the surface with the exception of the opening D, which is of such relatively small area as to not materially affect the result. When the manipulation of the dough is completed the cylinder may be revolved upon its trunnions by a suitable mechanism such as the hand-wheel N, worm-gearing O, shaft P and pinions Q engaging segmental rolls R on the drum so as to bring the cover C at the side. This cover is then opened and the dough mass ejected by the rotation of the shaft F and rolls H carried thereby.

The machine in operation will mix dough in a shorter period of time with the expenditure of less power, and will produce a better product than machines heretofore employed for a similar purpose; and while I do not fully understand the action, the results obtained I attribute to the substantial continuity of the inner surface of the receptacle—the flattened bottom portion thereof—and the rolls, which are independently revoluble and carried about through an orbit spaced from the surface of the cylinder but in proximity to the flattened portion thereof.

What I claim as my invention is:

1. A dough manipulating machine comprising a substantially uninterrupted, endless surface, a roll revoluble about its axis, means for carrying said roll through an orbit spaced from and substantially equidistant from said endless surface throughout substantially the entire extent thereof, and said surface having an elevation in proximity to the orbit of said roll, there being a space at the advancing side of the roll permitting its free independent action on the mass.

2. A dough manipulating machine comprising a cylindrical surface having a flattened segment, a roll revoluble about its axis, and means for carrying said roll through an orbit spaced from said cylindrical surface but in proximity to said flattened segment.

3. A dough manipulating machine comprising a cylindrical receptacle having a flattened bottom, and a revoluble member within said receptacle traveling through an orbit in proximity to said flattened bottom but spaced from the remaining portions of the surface of said cylinder.

4. A dough manipulating machine comprising a cylindrical receptacle, a revoluble member eccentrically mounted within said receptacle, said member including a plurality of radially extending arms all of which are the same length, rollers supported by said arms adjacent their terminals, said rollers contacting with the mass to simultaneously compress the mass and convey the same across the surface of the receptacle.

5. A dough manipulating machine comprising a cylindrical receptacle having a flattened bottom, a member revoluble within said receptacle, said member including rolls traveling in an orbit in proximity to the flattened bottom whereby there is greater clearance at the top of the receptacle than at the sides and bottom.

6. A machine for manipulating dough comprising a cylindrical receptacle having a flattened bottom and an upper portion slightly eccentric, a revoluble member within said receptacle, and rolls carried by said revoluble member through an orbit in proximity to said flattened bottom, spaced from said sides, and having a slightly greater spacing from the top of said cylinder, there being a space at the advancing side of the roll permitting its free independent action on the mass.

7. A machine for manipulating dough comprising a cylindrical receptacle having a flattened bottom, a revoluble member eccentrically mounted within said receptacle, and rolls carried by said revoluble member through an orbit in proximity to said flattened bottom, the member being so mounted that the rolls are spaced to a greater extent from the top of the receptacle than from the bottom and sides.

8. In a machine for manipulating dough, the combination of a substantially cylindrical receptacle and a revoluble member arranged within the receptacle, said member having conveying devices extending longitudinally of the receptacle and adapted to roll the material over the inner surface of the periphery of the receptacle, and means whereby said devices exert greater pressure on the mass at the base of the receptacle than at its top.

9. A dough manipulating machine comprising a cylindrical receptacle, a member mounted for movement within the receptacle, said member having kneading devices adapted to roll the material over the inner surface of the periphery of the receptacle, the kneading devices and receptacle being relatively proportioned and arranged whereby the kneading devices exert pressure on certain portions of the mass at intervals and in different degrees, the mass being periodically capable of expansion transversely of the receptacle.

10. A dough manipulating machine comprising a substantially cylindrical horizontally disposed container, a rotatable shaft projecting through the container, and a plurality of rolls mounted on said shaft, the rolls extending longitudinally of the container and rotatable about their longitudinal axis, and said rolls being adjacent to but spaced from the inner surface of the container and separated from one another by an unobstructed space, and one portion of said inner surface of the container being offset inwardly with regard to the body thereof whereby the rolls will assume a close position with respect to this portion of the container to exert greater pressure on the material at this point.

11. A dough manipulating machine comprising a working surface to receive the dough, a plurality of rolls movable over said surface and spaced therefrom, said rolls being adapted to roll the mass of material continuously over said surface, one portion of said surface being offset inwardly with reference to the body thereof, whereby the rolls in their movement over the surface will be brought closer to the offset portion of the surface than with regard to the other portions thereof, and thereby exert greater pressure at this point.

12. A dough manipulating machine comprising a stationary horizontally disposed curved working surface constituting a kneading board, a plurality of horizontally disposed rolls arranged adjacent to but spaced from said surface, said rolls being separated from one another by an unobstructed space, and means for imparting simultaneous bodily movement to said rolls about the arc of a circle, whereby to roll the material over said curved surface.

13. A dough manipulating machine comprising a stationary kneading surface, rollers having continuous smooth peripheries, the rollers extending transversely across said surface and spaced therefrom, said rollers being rotatable about their own axis, and means for imparting bodily movement to said rollers continuously in one direction whereby to engage a batch of dough positioned on said surface and by a kneading pressure to impart rolling movement to the dough mass along the surface, the space in advance, and to the rear, of the rollers being unobstructed whereby to prevent cutting or shredding of the dough.

In testimony whereof I affix my signature in presence of two witnesses.

JAMES C. GORDON.

Witnesses:
JAMES P. BARRY,
H. E. BOWMAN.